ANTENNA ROTATOR SYSTEM AND CONTROL UNIT THEREFOR

Filed Feb. 18, 1955 2 Sheets-Sheet 1

INVENTORS
ARNE BENSON
DAVID KELLERMAN
JORDAN KAWALLER
BY
Mock + Blum
ATTORNEYS

ANTENNA ROTATOR SYSTEM AND CONTROL UNIT THEREFOR

United States Patent Office 2,815,501

Patented Dec. 3, 1957

2,815,501

ANTENNA ROTATOR SYSTEM AND CONTROL UNIT THEREFOR

Arne Benson, Brooklyn, David Kellerman, Bayside, and Jordan Kawaller, Hicksville, N. Y., assignors to JFD Manufacturing Co., Inc., Brooklyn, N. Y., a corporation of New York Application February 18, 1955, Serial No. 489,052

5 Claims. (Cl. 340—226)

This invention reates to improvements in electrically-operated rotator assemblies for antennae, particularly television antennae, and is especially directed to the electrical control unit and its circuit for operating the rotator.

It is an object of the invention to provide a control unit of small, compact, and attractive appearance suitable for placement upon or next to the television receiver in the home, the control unit being connected by a single cable to a motor-driven rotator unit mounted on the television mast on the roof of the building.

Another object of the invention is the provision of a control unit of the character described which includes a meter and dial for indicating the direction in which the antenna is facing, both while the antenna is being rotated and when it has stopped.

Still another object of the invention is the provision of a control unit of the character described which is directly connected to the television receiver for control by the on-off switch of the television receiver. In this manner, the control unit is energized only when the television receiver is in operation.

A further object of the invention is the provision of a control unit of the character described in which rotation of a reversible motor in the rotator unit is controlled by a single bar which pivots in opposite directions to selectively actuate a pair of switches in the control unit, the bar being so constructed to prevent simultaneous closing of the pair of switches.

A further object of the invention is the provision of a control unit of the character described in which the circuit for actuating the motor, and the circuit controlling the meter are independently energized but have a common return lead so that a minimum number of wires are required to connect the rotator and control units.

Other objects and advantages of the invention will be apparent in the course of the following specification when taken in connection with the accompanying drawings, in which.

Figures 1, 2, 3, 9:
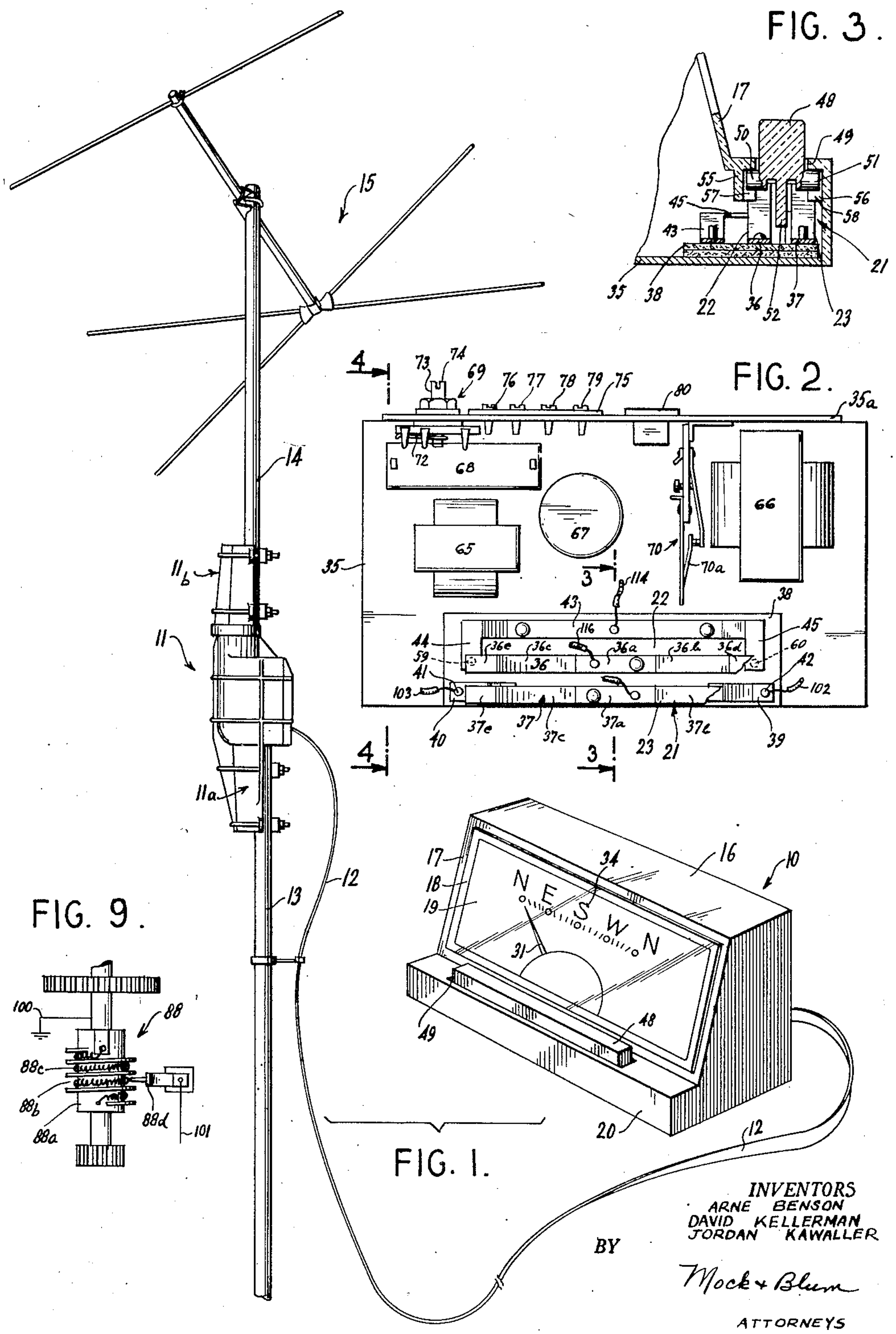
Fig. 1 is a perspective view showing the rotator unit mounted on a mast and carrying an antenna, and the control unit connected thereto by an electrical cable, the control unit being drawn on a larger scale than the rotator unit for clarity of illustration.
Fig. 2 is a top plan view of the control unit with its upper casing removed to reveal the base and the parts mounted thereon, certain of these parts being broken away for convenience.
Fig. 3 is an enlarged partial section along line 3—3 of Fig. 2, but with the upper casing and its contained parts shown in assembled position.
Fig. 9 is a partial elevational view of the interior of the rotator unit showing the information rheostat therein which is connected to the control unit.

Fig. 1 shows the control unit 10 and the rotator unit 11 which together form the antenna rotator system, and which are electrically connected by a four-lead flexible cable 12.

The rotator unit 11 shown in Fig. 1 is completely shown and described in the co-pending U. S. patent application, Serial Number 489,204 in the names of Arne Benson and Benjamin Titow, and assigned to the assignee of this application and will therefore not be described in detail herein. Generally, it comprises a lower mount **11*a* in which an upper spindle 11*b* is rotatably mounted. The lower mount 11*a* is fixedly secured on a mast 13 which is rigidly mounted upright on the roof of a building or other suitable location. Enclosed within the mount 11*a* is a reversible electric motor, and a step-down gear train connecting the motor to the spindle 11*b* for rotation of the latter in either direction relative to the fixed mount 11*a*. The spindle 11*b* carries an auxiliary mast 14 on which the television antenna 15 is mounted. The antenna shown in Fig. 1 is illustrated only by way of example, since the assembly is intended to rotate any type of antenna, particularly heavy antenna assemblies in stacked array. It will be appreciated, however, that when the motor contained in the mount 11 is actuated, the mounted antenna 15** will be rotated in a desired direction through a selected angle.

The control unit 10 shown in Fig. 1 is drawn on a substantially larger scale than the rotator 11 and antenna 15, for convenience of illustration. Actually, the control unit is small and compact, being intended to be located in the house near the television receiver, preferably atop the television cabinet.

The control unit 10 has an insulated hollow housing 16 preferably made of an insulating material such as a plastic, and of the generally rectangular shape shown in Fig. 1. The sloping front wall 17 of the housing 16 has a large central window 18 covered by a sheet 19 of transparent material such as glass or transparent plastic. The front wall 17 terminates at its lower end in a forwardly-extending hollow housing extension 20 which houses switch means 21.

Figures 4, 6, 7:
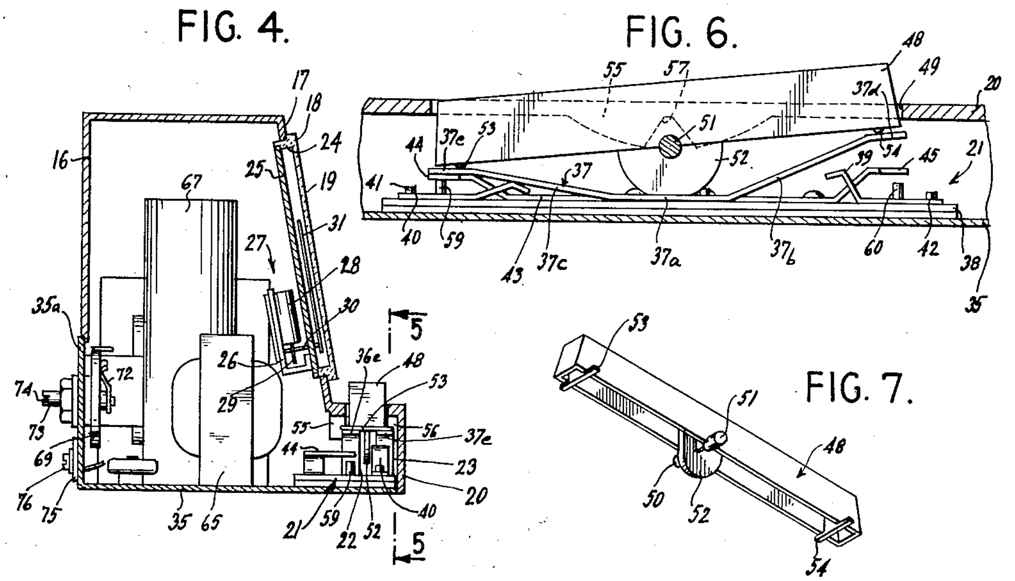
Fig. 4 is a section taken along line 4—4 of Fig. 2, again with the upper casing and its parts in assembled position.
Fig. 6 is an enlarged partial section similar to Fig. 5 but showing the switch means in one position of operation.
Fig. 7 is a bottom perspective view of the control bar used to actuate the switch means.

The transparent sheet 19, as shown in Fig. 4, has a peripheral border flange 24 which fits snugly within the recess of window 18. The flange 24 is chamfered to receive and mount an opaque plate 25 behind the transparent sheet 19. An L-shaped bracket 26 is mounted rigidly on the inner surface of the plate 25, the bracket 26 carrying an ammeter 27 of the non-linear type which serves as the antenna position-indicating meter of the assembly. The meter 27 includes a coil 28 in which an active iron segment 29 is freely movable. The segment 29 is keyed to a shaft 30 which is journalled in the bracket 26 and in the plate 25. The shaft 30 extends through plate 25 and carries at its free end an indicating needle 31 which is located between the plate 25 and transparent sheet 19.

The outer surface of the opaque plate 25 bears a scale 34 calibrated in points of the compass through 360°. For purposes of illustration, the scale commences with "N" for North and ends with "N" for North. The needle 31 which is visible through the transparent sheet 19 is positioned to traverse the scale 34 upon actuation of the meter 27 to indicate the angular position of the antenna while it is rotating as well as while it is at rest.

The housing 16 is closed off at its bottom by a removable base plate 35 upon which are mounted the electrical components of the control unit 10 with the exception of the meter 27. The base plate 35 has an upstanding rear extension 35*a* which forms the lower portion of the housing rear wall, as shown in Fig. 4. The base plate may be attached to the housing in the usual manner by screws (not shown) or other removable attachment means.

Figure 5:
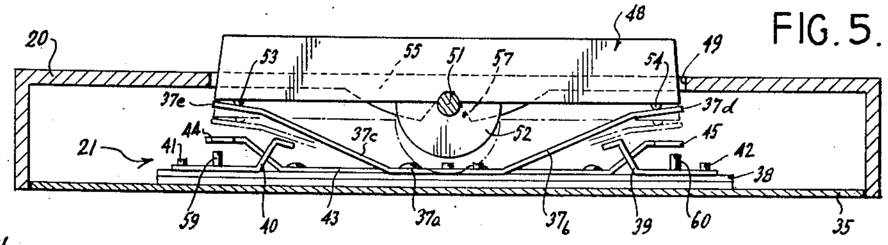
Fig. 5 is an enlarged vertical section taken along line 5—5 of Fig. 4, and showing the switch means in inoperative position.

The switch 21 includes two switch elements 22 and 23 which respectively comprise a pair of flat electrically-conductive metal strips 36 and 37 which are mounted at their centers by rivets to an insulating slab or plate 38 secured to the base plate 35. As shown in Fig. 2, the strips 36, 37 are of equal length and are mounted parallel and closely spaced from each other. As shown in Figs. 5 and 6, the strips 36, 37 have flat central portions 36*a*, 37*a* which are secured to the insulating plate 38 and opposite upwardly-inclined terminal portions 36*b*, 37*b*, and 36*c*, 37*c*. The terminal portions terminate in respective horizontally bent end portions 36*d*, 37*d* and 36*e*, 37*e*. The strips 36, 37 are resilient and springy so that they normally assume the inoperative position shown in Fig. 5. A bent contact strip 39 and 40 is located beneath each of the outer portions 37*c*, 37*b* of the strip 37 in position to make contact therewith when the portions 37*c*, 37*b* are depressed. The contact strips 39, 40 are secured to the insulating plate 38 by rivets 41, 42 which also serve as terminals for connecting the contact strips into the electrical circuit. A U-shaped metal strip 43 is also secured to the insulating plate 38 and has terminal perpendicular contact arms 44 and 45 located beneath the end portions 36*e* and 36*d* of the strip 36.

The switch 23 is actuated by an insulated control bar 48 which extends through an opening 49 in the top of the housing extension 20. As shown in Fig. 7 the control bar 48 is elongated and rectangular and is preferably hollow, having an open bottom end. The control bar is preferably made of plastic material and is molded with a pair of stub shafts 50 and 51 extending on opposite sides of its medial portion. Control bar 48 also has a depending center piece 52 which has a rounded bottom end extending a substantial distance below the open bottom end of the terminal bar 48. At each end of control bar 48 are respective abutment strips 53, 54 which extend transversely across the open bottom end thereof. The hollow front extension 20 of housing 16 has thickened depending internal wall portions 55 and 56 adjacent the opening 49 for guiding the movement of the control bar 48 in said opening. These wall portions 55 and 56 have outwardly-flaring cut-away slots 57, 58 at their centers for receiving the stub shafts 50, 51 of the control bar 48.

In the mounted position of the control bar 48, shown in Figs. 3 and 5, the resilience of the strips 36 and 37 press the control bar 48 upwardly at its ends so that the stub shafts 50, 51 are located at the top of slots 57, 58. The stub shafts 50, 51 are cylindrical in shape and serve as pivots for pivoting either end of the control bar downwardly through the opening 49.

If the left-hand end of the control bar 48 is pivoted downwardly as shown in Fig. 6, the abutment strip 53 contacts the end portions 36*e*, 37*e* of both strips 36, 37 pressing these end portions downwardly and moving the strips 36, 37 into abutment with the contact strip 40 and contact arm 44. At the same time the opposite outer portions 36*b*, 37*b* by their resilience maintain the right-hand end of the control bar 48 in raised position. The opposite effect occurs when the right-hand side of the control bar 48 is depressed, the contacts 39 and 45 being engaged by the strips 36, 37.

Respective upright studs or posts 59, 60 are located beneath the contact arms 44 and 45, the studs serving as stops to prevent further downward pivoting of the control bar 48 after the strips 36, 37 and the contacts are in firm engagement.

In the neutral or inoperative position of the control bar 48 shown in Fig. 5, the depending center piece 52 is spaced a short distance above the insulated slab 38. The center piece 52 is made of sufficient height that if by inadvertence, the control bar 48 is depressed at its center, the center piece 52 abuts the insulated slab 38 before either outer portion of the strips 36 and 37 can come into engagement with any of the contacts 39, 40, 44 or 45. Such position of the control bar 48 is shown in phantom in Fig. 5. This feature prevents accidental shorting of the unit by closing both ends of the switch 21 simultaneously.

It will be observed that the bent contact ends of the contact strips 39 and 40 are located closer to the fixed center portion of the metal strip 37 than are the contact arms 44, 45 of the U-shaped metal strip to the fixed center portion of strip 36. Owing to the inclination of the strip outer portions 36*b*, 36*c* and 37*b*, 37*c*, the contact strip 39 or 40 will be engaged by the strip 37 before the contact arm 44 or 45 is engaged by strip 36. This feature is important in operation of the circuit, as will be presently explained.

The switch 23 actuates a pair of circuits, components of which are mounted on the base plate 35. These include a pair of transformers 65 and 66, a capacitor 67, a resistor 68, a potentiometer 69, and a thermal switch 70.

The potentiometer 69 is mounted on the upstanding rear extension 35*a* of the base plate 35 and is of the conventional circular type having the usual resistance coil 71 and slider 72. A shaft 73 for turning slider 72 extends through the rear base plate extension 35*a* and has a kerfed end 74 for engagement by a screw-driver or similar tool for manual adjustment of the potentiometer from outside the housing 16.

Also mounted on the rear base plate extension 35*a* is a terminal strip 75 containing terminals 76, 77, 78 and 79, and a socket 80 for receiving the inlet plug of the television receiver.

The thermal switch 70 is of the bimetallic type having a pair of flat metal arms 112 of resistant material which heat when current passes therethrough. The central arm 70*a* is bimetallic and carries a contact 111 which is normally spaced from a fixed contact 110, but which moves into engagement with the fixed contact 110 when the bimetal 70*a* is heated by the arms 112.

Figure 8:
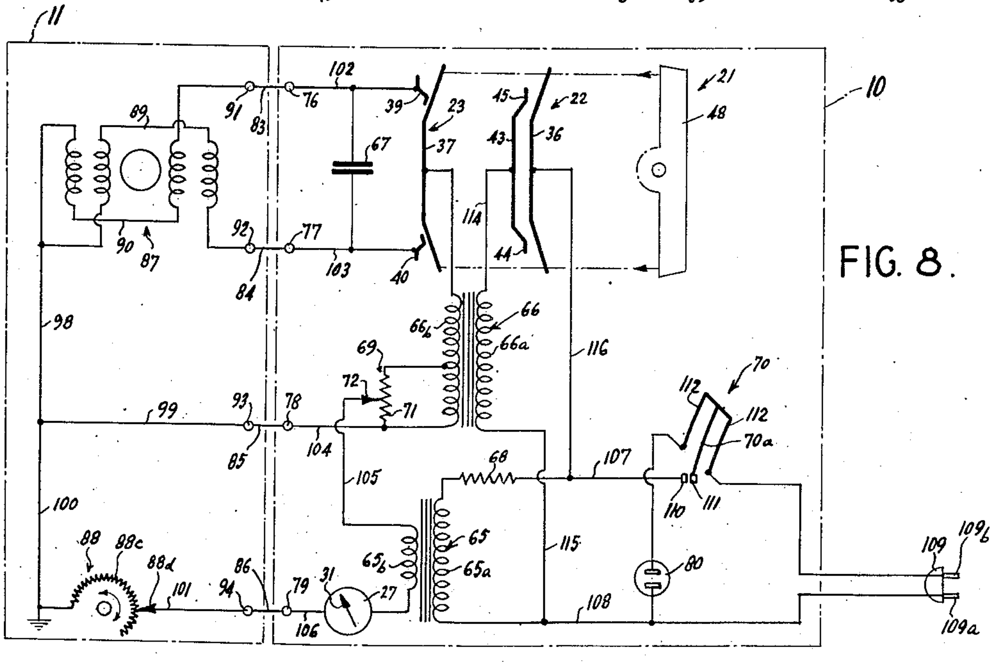
Fig. 8 is a schematic circuit diagram showing the manner in which the control unit is electrically connected to the rotator unit.

Fig. 8 shows a circuit diagram in which the control unit 10 is electrically connected to the rotator unit 11 which is physically remote therefrom and in which the antenna is mounted for rotation by a reversible electric motor 87 having two separate pairs of windings 89 and 90, the windings of each pair being connected in series. The rotator unit 11 also includes a rheostat 88 whose resistance is variable in accordance with the rotation of the antenna. This rheostat 88 is shown in detail in Fig. 9 and comprises a molded cylindrical core 88*a* of insulated plastic material having a helical groove 88*b* therein. Helically coiled resistance wire 88*c* is secured within the groove 88*b*. A wiper arm 88*d* is fixedly mounted adjacent the core 88*a* and is of flexible metal, having its free end extending within the groove 88*b* and making contact with the coil 88*c* therein. As explained fully in the aforementioned co-pending U. S. patent application, Serial Number 489,204, the rotator unit 11 has an enclosed step-down gear train connecting the motor 87 to the antenna for rotation of the latter. The rheostat core 88*a* is mounted intermediate the said gear train for simultaneous rotation in either direction with the antenna. As the core is rotated, the end of wiper arm 88*d* traverses the helical groove 88*b* and travels along the length of the resistance coil 88*c*. One end of the coil 88*c* is connected through ground to the control unit circuit, as shown in Fig. 8, and the fixed wiper arm 88*d* is also connected in this circuit.

In the circuit diagram of Fig. 8, the four-lead cable 12 is shown as containing the leads 83, 84, 85 and 86, connecting the rotator unit circuit to the control unit circuit. The rotator unit circuit is shown as including the motor 87 and rheostat 88.

The rotator unit also has a terminal strip bearing the separate terminals 91, 92, 93 and 94. One end of the motor winding 90 is connected to terminal 91, while an end of the other motor winding 89 is connected to the terminal 92. The other ends of both windings 89 and 90 are connected together and through lines 98 and 99 to terminal 93. Line 98 is also connected through line 100 to coil 88*c* of rheostat 88, whose wiper arm 88*d* is connected by line 101 to terminal 94.

In the control unit, terminal 76 is connected by line 102 to the contact 39 of switch element 23. The other contact 40 of switch element 23 is connected through line 103 to terminal 77. One end of the secondary winding 66*b* of transformer 66 is connected to the metal strip 37 of switch element 23. The other end of the secondary transformer winding 66*b* is connected through line 104 to terminal 78. The coil 71 of potentiometer 69 is connected at one end to an intermediate top of the transformer secondary coil 66*b* and at its other end to the line 104. The potentiometer slider 72 is connected by line 105 to one end of secondary winding 65*b* of transformer 65. The other end of the secondary winding 65*b* is connected through meter 31 and line 106 to terminal 79.

The circuit of primary winding 65*a* of transformer 65 includes the usual input plug 109 having a pair of terminals 109*a* and 109*b* adapted to be connected to a source of alternating current, which is optionally 110 volts, 60 cycles. Terminal 109*a* of plug 109 is connected by line 108 to one end of winding 65*a*. Socket 80 and the heater arms 112 of thermal switch 70 are connected in series between line 108 and plug terminal 109*b*. The inlet plug of a television receiver may be plugged into the socket 80, and when the receiver is turned on, current flows through the thermal switch arms 112, causing the arms to heat the bimetal arm 70*a* and closing contacts 110 and 111. Contact 110 is connected by line 107 and resistance 68 to the other terminal of the primary winding 65*a*.

The primary 66*a* of transformer 66 is connected at one end by line 114 to the contact strip 43 of switch element 22, and at its other end by line 115 to line 108. The metal strip 36 of switch element 22 is connected through line 116 to line 107. The primaries of transformers 65 and 66 are therefore connected in parallel to the current source, but the circuit through transformer primary 66*a* is not completed until the switch element 22 is closed.

The operation of the circuit is as follows:

Plug 109 is connected to a source of alternating current and the television receiver is plugged into socket 80. As long as the television receiver is inoperative, no current flows through the control unit since contacts 110, 111 are open. When the television receiver is turned on, the circuit through the thermal switch 70 is completed, the arms 112 are heated and cause bimetal 70*a* to close contacts 110, 111.

As a result of the current flow through primary winding 65*a*, secondary winding 65*b* serves as a source of voltage for the circuit of meter 27. The thermal switch 70 permits the energization of the meter circuit by operation of the on-off switch of the television receiver. As long as the television receiver is turned on, current flows from one terminal of primary secondary 65*b*, through line 105, slider 72, potentiometer coil 71, line 104, long cable lead 85, lines 99 and 100, rheostat coil 88*c*, line 101, long cable lead 86, line 106, and the coil of meter 27 to the other terminal of secondary winding 65*b*.

The resistance of rheostat 88 is high compared to the tapped resistance of potentiometer 71 and the resistances of the various lines and leads in the meter circuit, and is such as to produce relatively low current in this circuit. As a result, almost all of the voltage drop of the circuit occurs across rheostat 88. In any event, meter 27 is calibrated so that its pointer 31 gives a dial reading corresponding to the current flow position of the wiper arm 88*d* of rheostat 88 on the coil, which in turn depends upon the angular position of the mounted antenna.

When switch element 22 is closed on either side thereof, current flows from the current source through said switch element 22 and through the primary winding 66*a* of transformer 66. Accordingly, the secondary winding 66*b* of transformer 66 now serves as a source of current for motor 87. Depending upon which side of switch element 23 is closed, one or the other of motor windings 89 or 90 will be energized. If the metal strip 37 of switch element 23 is closed with contact strip 40, current flows from one terminal of secondary transformer winding 66*b* through line 103 and the long cable lead 84, through motor winding 89, lines 98 and 99, long cable lead 85 and line 104 to the other terminal of secondary winding 66*b*. It will be obvious that if the switch contact 39 is instead closed, current will flow in the same manner through the other motor winding 90, to cause the motor to rotate in the opposite direction.

The resistance of rheostat 88 is changed linearly in a manner dependent upon the direction in which motor 87 turns the antenna, that is, when the motor 87 turns in one direction the resistance of rheostat 88 is increased, and in the other direction is decreased. The reading of meter 27 changes accordingly.

It will be observed that both the meter circuit and the motor circuit have a common return lead composed of lines 99 and 104 and lead 85. This permits the use of a four-lead connecting cable instead of a five or six lead cable which would add to the expense of installation. The common return lead will carry heavy motor current when the antenna is being rotated and no motor current when the antenna is at rest. For reason of economy, wind resistance, maneuverability, etc., all leads 83, 84, 85, 86 of the cable 12, including the common return lead 85 are of small cross-section. Considering the long length required of the four-lead cable 12 and also the low-voltage, high-current motor 87 utilized for reasons of safety, it will be appreciated that the voltage drop in the return common lead 85 may be considerable. This voltage drop will vary for each particular installation depending on the length of connecting cable employed, but will occur only at the time that motor 87 is actuated, never when the motor is inactive. Consequently, if the compensating potentiometer 69 were not provided, the meter reading while the motor was inactive would be a true reading, and the meter needle would jump when the motor was actuated, giving a false reading while the antenna was rotating.

The manner in which potentiometer 69 serves to compensate for the voltage drop across long lead 85 is as follows:

When transformer secondary 66*b* is energized, there is a constant voltage drop across the entire potentiometer coil 71. It will be apparent that the portion of this voltage drop, which is tapped off in the meter circuit, is substantially opposite in phase to the voltage drop across the long cable lead 85. The position of the slider 72 may be set at the time of installation of the rotator assembly to make the voltage drop tapped off from potentiometer coil 71 substantially equal in magnitude to the voltage drop across long cable lead 85. Accordingly, the current in line 106 remains substantially the same for a given setting of potentiometer 69, whether or not motor 87 is in operation.

Automatic voltage regulation for the meter circuit which minimizes the effect of line voltage variations is provided by the saturated transformer 65 and the line dropping resistor 68.

As was previously explained, manual depression of the switch control bar 48 in either direction will close both the circuit of the transformer primary 66*a* and the circuit of transformer secondary 66*b* through motor 87. The switch 21 is arranged, however, so that the switch element 23 closes before the switch element 22. Thus the secondary transformer circuit through one of the motor windings 89 or 90 is closed before the primary winding 66*a* is energized. Thus sparking and break-down is prevented in switch element 23 due to the high current, low voltage characteristic of the circuit of transformer secondary 66*b*.

The capacitor 67 is connected across lines 102 and 103 for use with the split capacitor type motor 87, said capacitor 67 serving in the usual manner to cause a phase lag in the rotating A. C. field of the motor.

In a commercial embodiment, transformer 65 had a 6 volt output, and transformer 66 had a 30 volt output under no load and a 24 volt maximum output at 1.5 amperes. Transformer secondary 66*b* was tapped at 6 volts. Rheostat 88 had a 200 ohm coil. Meter 27 was an A. C., 80 ohm meter operating at 2–6 volts. Line resistor 68 had a resistance of 750 ohms. Motor 87 was a reversible, split capacitor, 24 volt type, while condenser 67 was a non-polarized electrolytic capacitor of 70 microfarads, 65 volt, A. C.

While a preferred embodiment of the invention has been shown and described herein, it is obvious that numerous omissions, changes and additions may be made, without departing from the scope and spirit of the invention.

What is claimed is:

1. In an antenna rotator system including a reversible electric motor having a first winding for rotating the antenna in one direction and a second winding for rotating the antenna in the opposite direction, a control unit adapted to be located remote from said motor and electrically connected thereto, said control unit including a power transformer, switch means comprising a control bar pivoted at its center for downward swinging movement of its opposite ends, first and second normally-open switch members located beneath one end of said control bar, third and fourth switch members located beneath the other end of said control bar, circuit means including said first switch member for connecting the transformer secondary with the first motor winding, circuit means including said third switch member for connecting the transformer secondary with the second motor winding, circuit means including said second and fourth switch members for connecting the transformer primary with a source of electric power, the first and third switch members being located closer to said control bar than are the second and fourth switch members, whereby the secondary transformer circuit is closed before the primary transformer circuit upon depression of either end of said control bar.

2. In a remote control antenna system having a motor, a motor transformer, motor switch means connecting one end of the motor transformer secondary to one side of the antenna motor, a variable resistor, a meter, a meter transformer, and means including said meter connecting one end of the meter transformer secondary to one side of said variable resistor, an improvement in the means for connecting the end of the motor transformer secondary which is remote from the motor switch means to the side of the antenna motor which is remote from the motor switch means, and for connecting the end of the meter transformer secondary which is remote from the meter to the side of the variable resistor which is remote from the meter, said improvement comprising a single conductor adapted to be extended between the unit housing the switch and the unit housing the motor, and a tapped voltage divider, one end of said conductor being adapted to be connected to both the side of the motor which is remote from the motor switch means and the side of the variable resistor which is remote from the meter, the other end of said conductor and one side of the voltage divider being adapted to be connected to the end of said motor transformer secondary which is remote from the motor switch means, the other side of the voltage divider being adapted to be connected to said motor transformer secondary at a point thereof away from the first side of the voltage divider, the tap being adapted to be connected to the end of said meter transformer secondary which is remote from said meter, whereby the voltage drop between the tap and the first side of the voltage divider is adapted to oppose the voltage drop in said conductor resulting from motor current when both the motor and the motor transformer are energized.

3. In a remote control antenna system having a motor, a motor transformer, motor switch means connecting one end of the motor transformer secondary to one side of the antenna motor, a variable resistor, a meter, a meter transformer, and means including said meter connecting one end of the meter transformer secondary to one side of said variable resistor, an improvement in the means for connecting the end of the motor transformer secondary which is remote from the motor switch means to the side of the antenna motor which is remote from the motor switch means, and for connecting the end of the meter transformer secondary which is remote from the meter to the side of the variable resistor which is remote from the meter, said improvement comprising a single conductor adapted to be extended between the unit housing the switch and the unit housing the motor, one end of said conductor being connected to both the side of the motor which is remote from the motor switch means and the side of the variable resistor which is remote from the meter, the other end of said conductor being adapted to be connected to the end of said motor transformer secondary which is remote from the motor switch means, voltage compensating means adapted to be coupled to said motor transformer secondary, and means including said voltage compensating means coupling said other end of said conductor to the end of said meter transformer secondary which is remote from the meter, said voltage compensating means being adapted to produce a voltage drop in the circuit of the meter which opposes the voltage drop in said conductor resulting from energization of said motor transformer and said motor.

4. In a remote control antenna system, comprising means including an electric motor for rotating an antenna, a variable resistor located adjacent to and operatively connected to said motor so that the resistance of said variable resistor varies when said antenna is rotated, a control unit adapted to be located remote from said motor and comprising a first transformer having a first primary and a first secondary, a second transformer having a second primary and a second secondary, means for connecting said primaries respectively to a source of electric power, normally open switch means connected at one side thereof to one end of said first secondary, and a current indicating meter connected at one side thereof to one end of said second secondary, and conducting means for operatively coupling said control unit to said motor and said variable resistor, said conducting means comprising at least one conductor connecting the other side of said switch means to one side of said motor, a further conductor connecting the other side of said meter to one side of said variable resistor, and means connecting the other end of said second secondary to the other side of said variable resistor and the other end of said first secondary to the other side of said motor, the improvement wherein said connecting means comprises a single final conductor and a voltage dividing resistor coil having an adjustable tap, said final conductor being adapted to be extended between the motor and the control unit, one end of said final conductor being connected to both said other side of said motor and said other side of said variable resistor, the other end of said final conductor being connected to the other end of said first secondary, said voltage dividing resistor coil being connected to said other end of said first secondary and across at least a portion of said first secondary, said tap being connected to said other end of said second secondary, whereby the voltage drop across said voltage divider between said tap and said other end of said first secondary opposes the voltage drop in said final conductor resutling from current flow in said motor when both said first transformer and said motor are energized, said tap being adapted to be adjusted so that the two voltage drops are substantially equal in magnitude.

5. In a remote control antenna system comprising means including an electric motor for rotating an antenna, a variable resistor located adjacent to and operatively connected to said motor so that the resistance of said variable resistor varies when said antenna is rotated, a control unit adapted to be located remote from said motor and comprising a first transformer having a first primary and a first secondary, a second transformer having a second primary and a second secondary, means for connecting said primaries respectively to a source of electric power, normally open switch means connected at one side thereof to one end of said first secondary, and a current indicating meter connected at one side thereof to one end of said second secondary, and conducting means for operatively coupling said control unit to said motor and said variable resistor, said conducting means comprising at least one conductor connecting the other side of said switch means to one side of said motor, a further conductor connecting the other side of said meter to one side of said variable resistor, and means connecting the other end of said second secondary to the other side of said variable resistor and the other end of said first secondary to the other side of said motor, the improvement wherein said connecting means comprises a single final conductor and voltage compensating means, said final conductor being adapted to be extended between the motor and the control unit, one end of said final conductor being connected to both said other side of said motor and said other side of said variable resistor, the other end of said final conductor being connected to the other end of said first secondary, said voltage compensating means being connected across said first secondary and also serving to connect said other end of said second secondary to said other end of said final conductor, said voltage compensating means being adapted to produce a voltage drop in the circuit of the meter which opposes the voltage drop in said final conductor resulting from energization of said first transformer and said motor.

References Cited in the file of this patent

UNITED STATES PATENTS

| | | |
|---|---|---|
| 2,115,327 | Coates | Apr. 26, 1938 |
| 2,424,668 | Riche | July 29, 1947 |
| 2,433,970 | Yardeny | Jan. 6, 1948 |
| 2,439,201 | Clark | Apr. 6, 1948 |
| 2,695,343 | Howard | Nov. 23, 1954 |
| 2,701,353 | Van Sickle | Feb. 1, 1955 |
| 2,711,527 | Barrett | June 21, 1955 |
| 2,736,854 | Will | Feb. 28, 1956 |